(12) United States Patent
Rayo Casco et al.

(10) Patent No.: US 10,285,542 B2
(45) Date of Patent: May 14, 2019

(54) HORIZONTAL FILLING TUBE WITH PISTON FOR FOOD PROCESSING APPARATUS

(71) Applicant: ZUMEX GROUP, S.A., Valencia (ES)

(72) Inventors: Fernando Rayo Casco, Valencia (ES); Jose Alberto Gonzalez Ruiz, Valencia (ES); Jose Luis Mataix Boronat, Valencia (ES)

(73) Assignee: ZUMEX GROUP, S.A., Valencia (ES)

( * ) Notice: Subject to any disclaimer, the term of this patent is extended or adjusted under 35 U.S.C. 154(b) by 69 days.

(21) Appl. No.: 15/298,965

(22) Filed: Oct. 20, 2016

(65) Prior Publication Data

US 2017/0112328 A1    Apr. 27, 2017

(30) Foreign Application Priority Data

Oct. 21, 2015   (ES) .................................. 201531511

(51) Int. Cl.
    *B67B 7/54*     (2006.01)
    *A47J 43/07*    (2006.01)
    *A23N 1/02*     (2006.01)
    *B26D 7/06*     (2006.01)

(52) U.S. Cl.
    CPC ................ *A47J 43/07* (2013.01); *A23N 1/02* (2013.01); *B26D 7/0608* (2013.01)

(58) Field of Classification Search
    CPC .............................. A47J 43/07; B26D 7/0608
    USPC ....................................................... 83/437.3
    See application file for complete search history.

(56) References Cited

U.S. PATENT DOCUMENTS

| | | | | |
|---|---|---|---|---|
| 1,752,160 A | * | 3/1930 | Erl ........................... | B26D 1/36 241/282 |
| 3,774,487 A | * | 11/1973 | Topliffe .................. | A21C 11/10 83/278 |
| 4,523,505 A | * | 6/1985 | Polson .................. | B26D 7/0641 83/409.2 |
| 4,760,766 A | * | 8/1988 | Short ...................... | B26D 1/29 83/356.3 |
| 8,495,941 B2 | * | 7/2013 | Farid ...................... | B26D 3/185 30/114 |
| 8,555,763 B2 | * | 10/2013 | Farid ...................... | B26D 3/185 30/114 |
| 8,794,555 B2 | * | 8/2014 | Garcia ................... | A47J 43/046 241/278.1 |
| 8,887,605 B2 | * | 11/2014 | van Gemert ........... | B02C 18/02 83/382 |
| 2014/0014754 A1 | * | 1/2014 | Machovina ........... | A47J 43/046 241/277 |

* cited by examiner

*Primary Examiner* — Ghassem Alie
*Assistant Examiner* — Bharat C Patel
(74) *Attorney, Agent, or Firm* — Vedder Price PC

(57) ABSTRACT

A filling tube for a food processing apparatus of the type having a cutting disc that cuts or chops the food present at the base of the filling tube. The filling tube includes a pushing piston that presses the food against the disc. The piston is connected to a lever through a crankshaft mechanism. The piston is guided by a series of semi-guides arranged along the stroke of the piston, there being at least one fixed semi-guide attached to the inner walls of the tube and one moving semi-guide that moves together with the piston.

11 Claims, 3 Drawing Sheets

HORIZONTAL FILLING TUBE WITH PISTON FOR FOOD PROCESSING APPARATUS

BACKGROUND OF THE INVENTION

(1) Field of the Invention

The invention relates to a filling tube for a food processing apparatus, preferably of the type comprising a revolving disc that cuts or chops up the food.

(2) Description of Related Art

Food processing apparatuses have been known for some time which comprise a cutting disc against which are pressed foodstuffs that move inside a filling tube with a base that covers, at least partially, the surface of the cutting disc.

Cutting disc herein refers to any revolving device which due to its speed, shape and hardness will cut, scrape, crush or chop foodstuffs.

To improve the action of the disc it is common to use pushing pistons that press the food against the disc.

Sometimes levers connected to the piston are used in order to reduce the effort required by the user.

Prior art for the use of levers connected to pushing pistons in food processing apparatuses include document GB1081280 which relates to an apparatus with a vertical filling tube comprising a cutting disc, a filling tube and a piston that moves inside the tube and a lever connected to said piston.

Document ES2423965 also relates to a food processing machine comprising a cutting disc and a vertical filling tube, improving on the former document in that when the piston is at the bottom position, the shafts on which the lever pivots are located under the top of the apparatus, thereby facilitating the task of storing the apparatus by reducing the height thereof when not in use.

The cited patents relate in both cases to machines with filling tubes arranged vertically, which is the usual case in small or table top apparatuses.

There are other types of food processing apparatuses with a larger size that can process, for example, pineapples or other large fruit, in which it is preferable that the position of the tube is essentially horizontal to facilitate for the user the introduction of the food since if the tube were vertical, the opening of the tube would be at a height that would hinder the use of the apparatus.

This is the case, for example, with fruit chopping and subsequent pulp pressing apparatuses, such as those marketed by the firms GOODNATURE™ (Goodnature Products Inc. of Orchard Park, N.Y.) or POMEROY™ (Pomeroy Equipment Co. of Las Vegas, Nev.), tutorials for which can be readily found on the Internet. However, these apparatuses lack a piston and lever system, using an independent piston that the user introduces and removes each time.

If a horizontal tube processing apparatus is used with a piston connected to a lever, it should be considered that the user, when operating the machine, will normally be opposite the opening of the filling tube, actuating the lever to raise or lower the piston and at the appropriate time moving the piston away from the tube opening to introduce more food.

As explained below, the aim of the invention is not to reduce the height of the machine when it is not being used, as in document ES2423965, but to prevent during handling, particularly when removing the piston, the moving parts protruding horizontally towards the user, representing a risk of accident.

In addition, in this type of machines for safety reasons the filling tubes are long in order to prevent introducing hands and arms in them.

The proposed invention intends to reduce the length of the filling tube without reducing safety conditions while operating the apparatus.

BRIEF SUMMARY OF THE INVENTION

The invention relates to a filling tube for a food processing apparatus, preferably of the type comprising a revolving disc that cuts or chops up the food.

To facilitate the action of the disc it is common in these machines to have a pushing piston that presses the food against the disc.

The force that the user must apply on the piston depends on the type of machine and the type of food processed.

To simplify the use thereof, several devices have been developed comprising levers that help apply force on the piston.

In the present case, the opening is substantially horizontal, such that the user, when operating the lever to exert pressure, will be directly opposite said opening.

To prevent the piston guides or other elements from touching the user during their movement, a system has been developed that minimises horizontal displacement of the moving parts of the piston or the auxiliary elements thereof, such as guides or levers among others.

To prevent the aforementioned risks, an essentially horizontal filling tube is proposed with a short length, traversed by a piston connected to a lever through a crankshaft system, where the filling tube comprises an opening, body and base, where the base is the part closest to the cutting disc and the opening is at the opposite end.

In the filling tube cross-section one of the axes, preferably the horizontal axis, is the greater axis. However, the invention can also be executed with a circular cross-section tube.

A piston travels inside the filling tube.

This piston comprises a head and a stem connected to a lever.

The piston stroke is from the base of the filling tube to a point outside said tube, beyond the opening, referred to as the end.

The piston is guided by a series of semi-guides, preferably three.

A semi-guide is understood to be a guide with a length shorter than the piston stroke, such that in order to guide the piston along its path at least two such semi-guides are required.

The invention belongs to the field of food processing machines.

DESCRIPTION OF AN EMBODIMENT OF THE INVENTION

The invention relates to a filling tube for a food processing apparatus, preferably of the type comprising a revolving disc that cuts or chops up the food.

Figure 1:
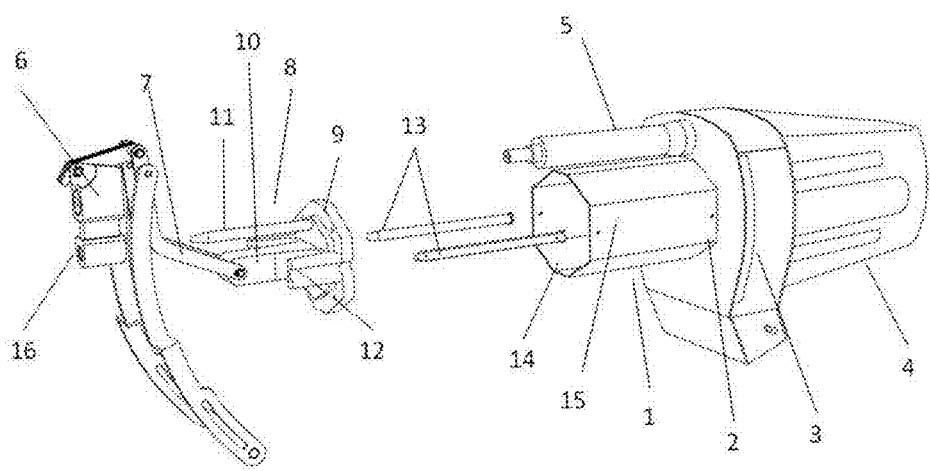
FIG. 1 shows an exploded view of the various components revealing a filling tube with an opening, body and base.

FIG. 1 shows an exploded view of the various components revealing the filling tube 1 with an opening 14, body 15 and base 2. The filling tube 1 is attached at its base 2 to a casing 3 inside which is the cutting disc 18 connected to a motor 4.

Parallel to the filling tube is the external shaft 5 about which pivots the support 6 that holds the lever 7 connected to the piston 8, which comprises the head 9, the stem 10, the moving semi-guide 11 and areas 12 with a complementary shape to the fixed semi-guides 13. The fixed semi-guides 13 are housed inside the filling tube 1, preferably adjoining its walls.

This figure also shows the orifice 16 present in the support 6, which is such that in its upward movement the moving semi-guide 11 can be inserted therein.

Figure 2:
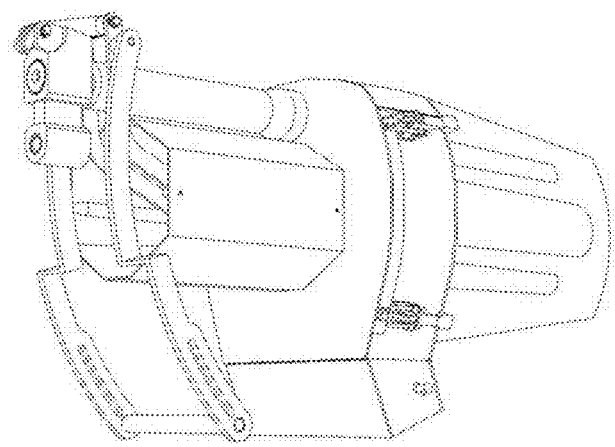
FIG. 2 shows the assembly when mounted.

FIG. 2 shows the assembly when mounted.

Figure 3:
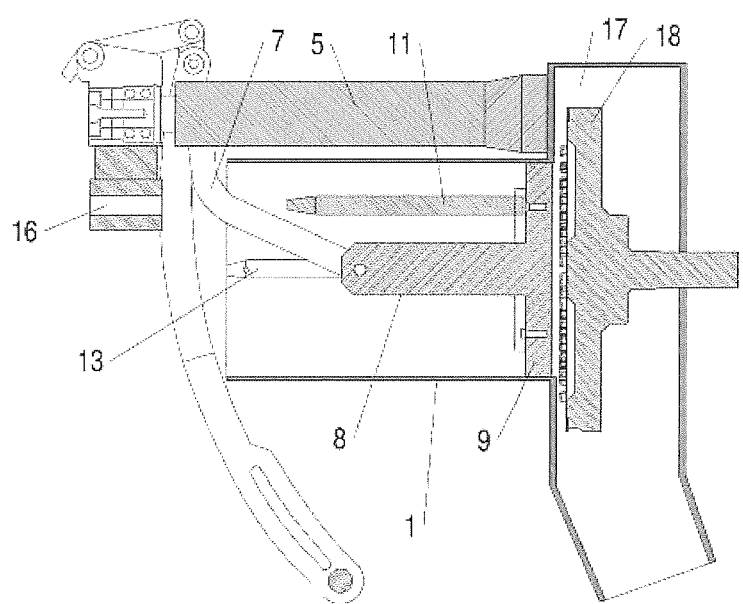
FIG. 3 shows a cross-section of the filling tube with the head of the piston near the base, showing the lever, a fixed semi-guide and the moving semi-guide aligned with the orifice present in the support, which in this case is joined to the external shaft.

FIG. 3 shows a cross-section of the filling tube 1 with the head 9 of the piston 8 near the base 2, showing the lever 7, a fixed semi-guide 13 and the moving semi-guide 11 aligned with the orifice 16 present in the support 6, which in this case is joined to the external shaft 5.

The cutting disc 18 is located in the cutting area 17.

To facilitate the action of the disc, it is common in these machines to have a pushing piston that presses the food against the disc. The force that the user must apply on the piston depends on the type of machine and the type of food processed. To simplify the use thereof, several devices have been developed comprising levers that help apply force on the piston. In the present case, the opening is substantially horizontal, such that the user, when operating the lever to exert pressure, will be directly opposite said opening.

To prevent the piston guides or other elements from touching the user during their movement, a system has been developed that minimises horizontal displacement of the moving parts of the piston or the auxiliary elements thereof, such as guides or levers among others.

To prevent the aforementioned risks, an essentially horizontal filling tube is proposed with a short length, traversed by a piston connected to a lever through a crankshaft system, where the filling tube comprises an opening, body and base, where the base is the part closest to the cutting disc and the opening is at the opposite end.

In the filling tube cross-section one of the axes, preferably the horizontal axis, is the greater axis. However, the invention can also be executed with a circular cross-section tube.

A piston travels inside the filling tube. This piston comprises a head and a stem connected to a lever. The piston stroke is from the base of the filling tube to a point outside said tube, beyond the opening, referred to as the end. The piston is guided by a series of semi-guides, preferably three.

A semi-guide is understood to be a guide with a length shorter than the piston stroke, such that in order to guide the piston along its path at least two such semi-guides are required.

Considering a design in which there are three semi-guides, the operation is as follows.

At least one of these semi-guides is mobile, integrally joined to the piston, sharing its movement from the base to the end, while the other two remain fixed inside the filling tube, preferably attached to the inner walls thereof. The piston head fills the inner cross-section of the filling tube.

Outside of the filling tube, at a point near its opening, there is a support in which the semi-guide that moves together with the piston is preferably inserted when the head of the piston is near the upper end of the fixed semi-guides.

In this way the length of the moving guide is reduced and thereby the space it occupies out of the assembly during the handling of the apparatus is reduced, consequently reducing the risk of accident.

To facilitate the introduction of food in the tube it is necessary to remove the piston from the filling tube opening, which in vertical filling tube apparatuses is a simple task as the piston and support assembly is made to pivot about an external shaft parallel to the piston stem.

In the present invention the external shaft is provided with an anti-return system to maintain the piston and its auxiliary elements away from the filling tube opening during the food introduction operations, or any other operation requiring access to the inside of the tube.

For safety reasons the assembly is provided with a disconnector such that when the opening of the filling tube is accessible the cutting disc will stop.

The term horizontal should be interpreted as the tube having an inclination of less than 40° to the horizontal, preferably less than 25% from the horizontal.

A non-limiting example of an embodiment of the invention is described below by way of illustration.

The horizontal filling tube with a pressure device for food processing apparatuses of the type including a revolving cutting disc comprises:

A filling tube 1 in which can be seen an opening 14, a body 15 and a base 2, where the base 2 is the area closest to the cutting disc 18 and the opening is at the opposite end of the filling tube.

A piston 8 comprising a head 9 and a stem 10 that moves from the base 2 of the filling tube 1 to a point outside the latter referred to as the end.

The piston 8 is connected through a crankshaft mechanism to a lever 7 that transmits the motion.

The piston head 9 fills the inner cross-section of the filling tube.

In order to guide the piston 8 in its stroke movement between the base 2 and the stop, three semi-guides are provided of which:

Two semi-guides 13 are fixed and arranged inside the filling tube 1, adjoining the walls thereof opposite each other arranged longitudinally along the length of the filling tube 1.

The third semi-guide 11 is mobile and moves together with the piston 8, attached on one end to the rear part of the piston head 9 and moving essentially parallel to the piston stem 10, while the other end is free.

When the piston 8 is near the base 2 it is guided by the fixed guides 13 located inside the filling tube 1. This guiding is achieved by the areas 12 with a complementary shape that slide using the semi-guides as a rail.

As the piston 8 moves away from the base 2, the free end of the moving guide 11 moves toward a support 6 provided with an orifice 16 in which the moving guide 11 can engage or insert itself When the head 9 of the piston is at a point near the opening 14 of the filling tube 1, the moving guide 11 inserts or engages the orifice 16 of the support 6.

The three guides 11 and 13 together guide the piston from the insertion of the moving guide 11 in the orifice 16 of the support 6 until the head 9 of the piston 8 moves beyond the length of the fixed guides 13, after which the piston is guided only by the moving guide 11 inserted at such time in the orifice 16 of the support 6.

Outside of the filling tube and parallel to the same is a pivoting external shaft 5 on which pivot the support 6 and, indirectly, the lever 7 and the piston 8.

At a specific time of the processing cycle, in order to introduce the food in the filling tube, the piston 8 is outside of the filling tube 1 and the opening 14 thereof must be free. For this purpose, the assembly formed by the support 6, lever 7 and piston 8 can be rotated about the pivoting external shaft 5 moving the assembly away from the opening 14 of the filling tube 1 and allowing new food to be inserted therein.

The device comprises an anti-return system to keep the piston 8, lever 7 and support 6 away from the opening 14 of the filling tube 1.

The assembly is provided with disconnectors such that when the piston 8 is away from the opening 14 of the filling tube 1 and the inside of the tube is accessible, the cutting disc will be stopped.

The disconnection device is preferably located in one of the guides.

To facilitate the centering of the piston 8 when it must be used again to push the food introduced in the filling tube 1, the assembly comprises centering means.

These centering means may be either means for limiting the rotation of the external shaft 5 or clearance centering means, such as widening the opening 14 of the filling tube in the form of a funnel, providing the piston head 9 with an inverted frustoconical shape, or a combination thereof.

Due to safety reasons, when the motor is disconnected the disc does not continue to rotate by its inertia; instead, systems such as braking means are provided to reduce the rotation time of the disc after disconnection.

The invention as described does not limit the number of fixed guides 13 and moving guides 11, although for the technical function thereof to be fulfilled the number of moving guides 11 must be equal to or less than the number of orifices 16 of the support 6, and the number of fixed guides must be equal to or less than the number of areas 12 with a shape complementary to the piston head.

The invention claimed is:

1. A horizontal filling tube for a food processing apparatus comprising a cutting disc, a piston positioned proximate to the cutting disc and exerting a pressure on a surface of the cutting disc, when food is placed inside the horizontal filling tube, wherein the horizontal filling tube having a body with a base adjacent to the cutting disc and an opposing open end having a shape complementary to the piston;
   a plurality of semi-guides including at least one fixed semi-guide and one moving semi-guide, where the fixed semi-guide is joined to the horizontal filling tube and where the moving semi-guide has one end joined to the piston and the other end being free, the moving semi-guide being oriented parallel to the piston movement and spaced from the body;
   an external shaft oriented parallel to the horizontal filling tube and configured for limited rotation;
   a support having at least one suitable orifice for introducing the free end of the moving semi-guide;
   wherein the support, the piston and a lever are configured to pivot on the external shaft.

2. The horizontal filling tube according to claim 1 wherein there are from two to five fixed guides.

3. The horizontal filling tube according to claim 2 wherein there are from two to four fixed guides.

4. The horizontal filling tube according to claim 1 wherein there are from one to five moving semi-guides.

5. The horizontal filling tube according to claim 4 wherein there are from one to two moving semi-guides.

6. The horizontal filling tube according to claim 1 wherein the number of areas with complementary shape is equal to or greater than the number of fixed semi-guides.

7. The horizontal filling tube according to claim 1 wherein the number of orifices in the support is equal to or greater than the number of moving semi-guides.

8. The horizontal filling tube according to claim 1 wherein one axis of the cross-section of the horizontal filling tube is greater than other axes of the horizontal filling tube.

9. The horizontal filling tube according to claim 1 wherein an assembly formed by a support, a lever and the piston, at a specific time in the processing cycle, is retained and separated from the open end of the horizontal filling tube.

10. The horizontal filling tube according to claim 7 wherein the piston has a head and a stem with the head filling the cross-section of the horizontal filling tube and having at least one area with the complementary shape.

11. The horizontal filling tube according to claim 1 wherein the lever is connected to the piston by a crankshaft mechanism that transmits the movement to the piston.

* * * * *